United States Patent [19]

Cook

[11] Patent Number: 5,108,563
[45] Date of Patent: Apr. 28, 1992

[54] PROCESS FOR TREATMENT OF WATER AND APPARATUS THEREFOR

[75] Inventor: Brian G. Cook, St. Catharines, Canada

[73] Assignee: Environmental Systems (International) Limited, Nassau, The Bahamas

[21] Appl. No.: 711,518

[22] Filed: Jun. 4, 1991

Related U.S. Application Data

[63] Continuation of Ser. No. 517,317, May 1, 1990, abandoned, which is a continuation-in-part of Ser. No. 415,988, Oct. 2, 1989, abandoned.

[51] Int. Cl.⁵ ............................................. C02F 1/00
[52] U.S. Cl. ................................... 204/149; 204/272; 204/277; 204/260
[58] Field of Search ................ 204/149, 272, 260, 277

[56] References Cited

U.S. PATENT DOCUMENTS

| | | | |
|---|---|---|---|
| 3,728,238 | 4/1973 | Tarjanyi et al. | 204/149 |
| 3,755,114 | 8/1973 | Tarjanyi et al. | 204/114 |
| 3,774,246 | 11/1973 | Beer | 204/149 |
| 3,788,967 | 1/1974 | Kawahata et al. | 204/277 |
| 4,029,557 | 6/1977 | Christensen et al. | 204/149 |
| 4,172,773 | 10/1979 | Pellegri et al. | 204/149 |
| 4,326,938 | 4/1982 | Das Gupta et al. | 204/149 |
| 4,396,474 | 8/1983 | Astruc et al. | 204/149 |
| 4,443,309 | 4/1984 | Van Duin et al. | 204/149 |
| 4,525,272 | 6/1985 | Henson | 204/228 |

FOREIGN PATENT DOCUMENTS

| | | |
|---|---|---|
| 867342 | 3/1971 | Canada . |
| 921430 | 2/1973 | Canada . |
| 980292 | 12/1975 | Canada . |
| 0145833 | 6/1985 | European Pat. Off. . |
| 434310 | 1/1912 | France . |
| 2133733 | 12/1972 | France . |
| 1539521 | 1/1979 | United Kingdom . |
| 88/09772 | 12/1988 | World Int. Prop. O. . |

Primary Examiner—John Niebling
Assistant Examiner—Arun S. Phasge
Attorney, Agent, or Firm—Fitzpatrick, Cella, Harper & Scinto

[57] ABSTRACT

A process for treating water comprises feeding water to be treated into an electrolytic cell. The electrolytic cell comprises a first electrode and a second electrode, wherein the first electrode at least partially encompasses the second electrode. The water to be treated is subjected to electrolysis in the presence of an electrolyte, and, preferably, in the presence of elemental carbon. An apparatus for conducting the process is also provided.

12 Claims, 4 Drawing Sheets

PROCESS FOR TREATMENT OF WATER AND APPARATUS THEREFOR

CROSS-REFERENCE TO RELATED APPLICATION

This application is a continuation of application Ser. No. 07/517,317 filed May 1, 1990, which is a continuation-in-part of U.S. Ser. No. 07/415,988, filed Oct. 2, 1989, both now abandoned.

FIELD OF THE INVENTION

The present invention relates to a process for treatment of water and to an apparatus therefor.

BACKGROUND OF THE INVENTION

Water pollution is an ever growing problem in todays society. Generally, water pollutants can be grouped into seven classes as follows:
1. Sewage and other oxygen-demanding wastes
2. Infectious agents
3. Plant nutrients
4. Exotic organic chemicals
5. Inorganic minerals and chemical compounds
6. Sediments
7. Radioactive substances Sewage and other oxygen-demanding wastes are generally carbonaceous organic materials that can be oxidized biologically (or sometimes chemically) to carbon dioxide and water. These wastes are problematic since their degradation leads to oxygen depletion, which affects (and can even kill) fish and other aquatic life; because they produce annoying odors; because they impair domestic and livestock water supplies by affecting taste, odors and colors; and because they may lead to scum and solids that render water unfit for recreational use.

Infectious agents are usually found in waste water from municipalities, sanatoriums, tanning and slaughtering plants and boats. This type of pollutant is capable of producing disease in man and animals, including livestock Plant nutrients (e.g. nitrogen and phosphorus) are capable of stimulating the growth of aquatic plants, which interfere with water uses and which later decay to produce annoying odors and increase the amount of oxygen-demanding waste in the water (see above).

Exotic organic chemicals include surfactants used in detergents, pesticides, various industrial products and the decomposition products of other organic compounds. Some of these compounds are known to be toxic to fish at very low concentrations. Many of these compounds are not readily biologically degradable.

Inorganic minerals and chemical compounds are generally found in water from municipal and industrial waste waters and from urban runoff. These pollutants can kill or injure fish and other aquatic life, and can also interfere with the suitability of water for drinking or industrial use. A prominent example is the occurrence of mercury in water. Another example is salt pollution from NaCl and $CaCl_2$ used to de-ice roads in winter in the northern, colder climates.

Sediments are soil and mineral particles washed from the land by storms and floodwaters, from croplands, unprotected forest soils, overgrazed pastures, strip mines, roads and bulldozed urban areas. Sediments fill stream channels and reservoirs; erode power turbines and pumping equipment; reduce the amount of sunlight available to aquatic plants; plug water filters; and blanket fish nests, spawn, and food supplies, thereby reducing the fish and shell fish populations.

Radioactive substances in water environments usually result from the wastes of uranium and thorium mining and refining; from nuclear power plants, and from industrial, medical, scientific utilization of radioactive materials.

It would be desirable to have a process for treating water which could remove at least one of the pollutants discussed above.

SUMMARY OF THE INVENTION

It is an object of the present invention to provide a novel process for treating water.

It is another object of the present invention to provide a novel apparatus for treating water.

Accordingly, in one of its aspects, the present invention provides a process for treating water comprising the steps of:

(a) feeding water into an electrolytic cell which comprises a first electrode and a second electrode; and (b) subjecting the water to electrolysis in the presence of an electrolyte;

wherein the first electrode is spaced from and at least partially encompasses the second electrode.

In another of its aspects, the present invention provides a process for treating water comprising the steps of:

(a) feeding water into an electrolytic cell which comprises a first electrode and a second electrode; and (b) subjecting the water to electrolysis in the presence of an electrolyte and elemental carbon;

wherein the first electrode is spaced from and at least partially encompasses the second electrode.

In yet another of its aspects, the present invention provides as apparatus for treating water comprising:

(a) an electrolytic cell which comprises a first electrode and a second electrode;

(b) means for introducing water to be treated into the cell;

(c) means for introducing an electrolyte into the cell;

(d) means for applying voltage to the cell; and (e) means for removing water after treatment in the cell;

wherein said first electrode is spaced from and at least partially encompasses the second electrode.

BRIEF DESCRIPTION OF THE DRAWINGS

Embodiments of the present invention will be described with reference to the accompanying drawings, in which.

DETAILED DESCRIPTION OF THE INVENTION

As used throughout the term "electrolysis" is meant to encompass passage of electricity through a solution to provide sufficient energy to cause an otherwise non-spontaneous reduction-oxidation (hereinafter referred to as "redox") reaction Moreover, the term "electrolyte" is meant to encompass substances which dissociate in solution to produce ions thereby enabling the solution to conduct electricity.

The present process and apparatus may be advantageously utilized for treating water. The term "treating water" is meant to encompass desalination of water, deposition of metals, microbiological load reductions, purification of industrial waste effluents (non-limiting examples include mine water effluent, smelting operations effluent, electroplating effluent, pulp and paper affluent), municipal sewage treatment effluent and the like.

Moreover, the present process can be used to decompose, without pre-extraction, organo-chlorine compounds such as polychlorinated biphenyl's (PCB's), dioxins and furans, and organo-bromine compounds such as polybrominated biphenyls (PBB's), known to be detrimental to the environment. To the Applicant's knowledge, the only manner by which, for example, PCB's can be decomposed effectively and on a commercial scale is by extraction from the effluent (if necessary) followed by thermal treatment at extremely high temperatures (e.g. 1500° C. and higher). Unfortunately, the furnace required to operate such a process is very expensive to construct and to operate. Further, decomposition of PCB's in this manner often leads to another pollution problem, namely that of air by the products of decomposition. Still further, the operation of such a furnace must be monitored very carefully to ensure that temperature drops do not occur and result in emission of the toxic by-products (i.e. incomplete destruction) of the PCB's.

In accordance, with one aspect of the invention, water to be treated is fed into an electrolytic cell. The electrolytic cell comprises a first electrode which is spaced from and at least partially encompasses a second electrode. Thus, one electrode functions as an anode whereas the other electrode functions as a cathode. It is not particularly important whether the first electrode functions as an anode or as a cathode. It is preferred that the cathode be the first electrode and the anode be the second electrode.

The first and second electrodes can be in a number of relationships with respect to one another. For example, in one embodiment, the first electrode can be the walls of the electrolytic cell and the second electrode can be held in place to be at least partially immersed in the water to be treated in the electrolyte cell.

In another, and preferred, embodiment, the first and second electrodes are each elongate and are in a coaxial relationship with respect to one another. The shape of the cross-section of the first and second electrodes is not particularly restricted, nor need the second electrode to be solid. For example, it is possible for this cross-sectional shape to be triangular, square, rectangular, hexagonal and the like. Preferably, the cross-section of the first and second electrodes is substantially circular. Such an arrangement of first and second electrodes allows for the use of a plurality of electrode pairs in the same electrolytic cell—this is not feasible using a plurality of parallel plate electrodes.

Figure 1:
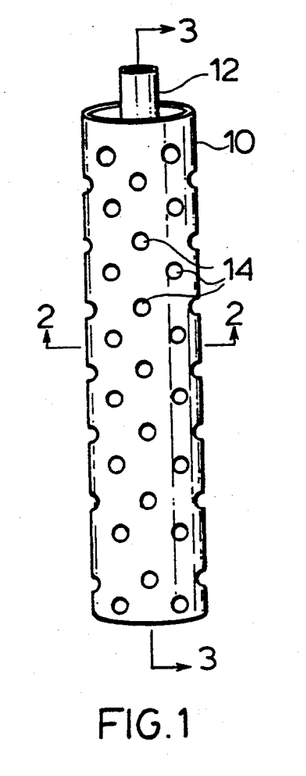
FIG. 1 is a top perspective view of a first and a second electrode.
Figure 2:
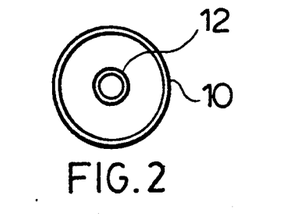
FIG. 2 is a sectional view along line II—II of FIG. 1.
Figure 3:
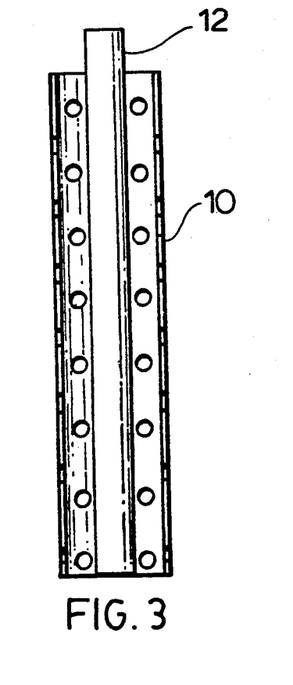
FIG. 3 is a sectional view along line III—III of FIG. 1.

An illustration of an arrangement comprising a first and second electrode in a coaxial relationship with respect to one another may be found in FIGS. 1, 2 and 3 wherein a second electrode 12 is a cylindrical solid disposed within a first electrode 10. First electrode 10 is a hollow cylinder which at least partially encompasses second electrode 12. In a more preferred embodiment, first electrode 10 comprises a plurality of perforations 14. While the distance between first electrode 10 and second electrode 20 is not particularly restricted, it is preferred that the ratio of the diameter of the first electrode to the diameter of the second electrode be in the range of from about 1.10 to about 3.50, more preferably from about 1.10 to about 1.75, most preferably from about 1.10 to about 1.30.

Figure 4:
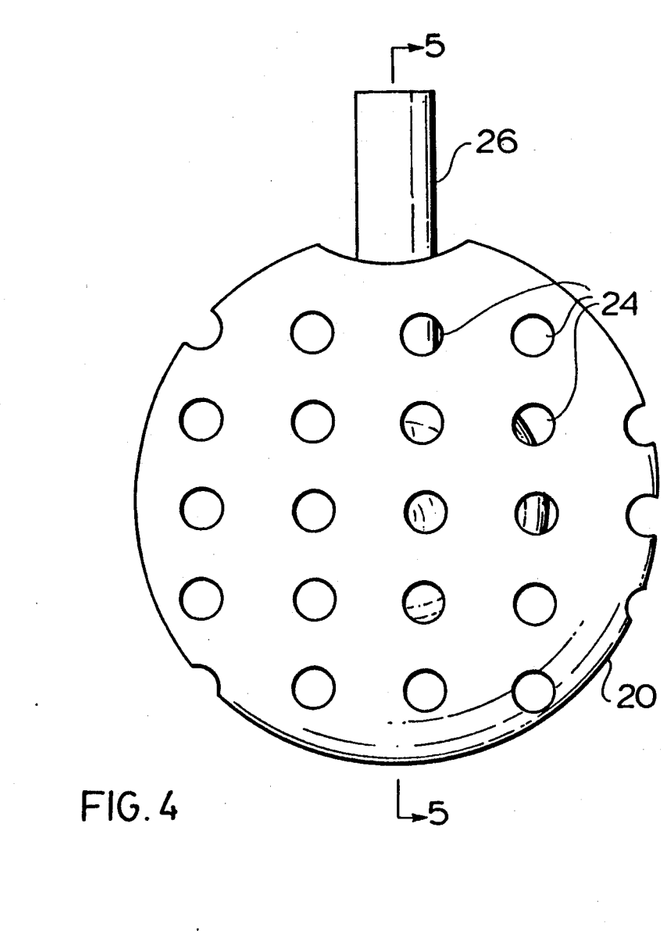
FIG. 4 is an elevation of a first and second electrode.
Figure 5:
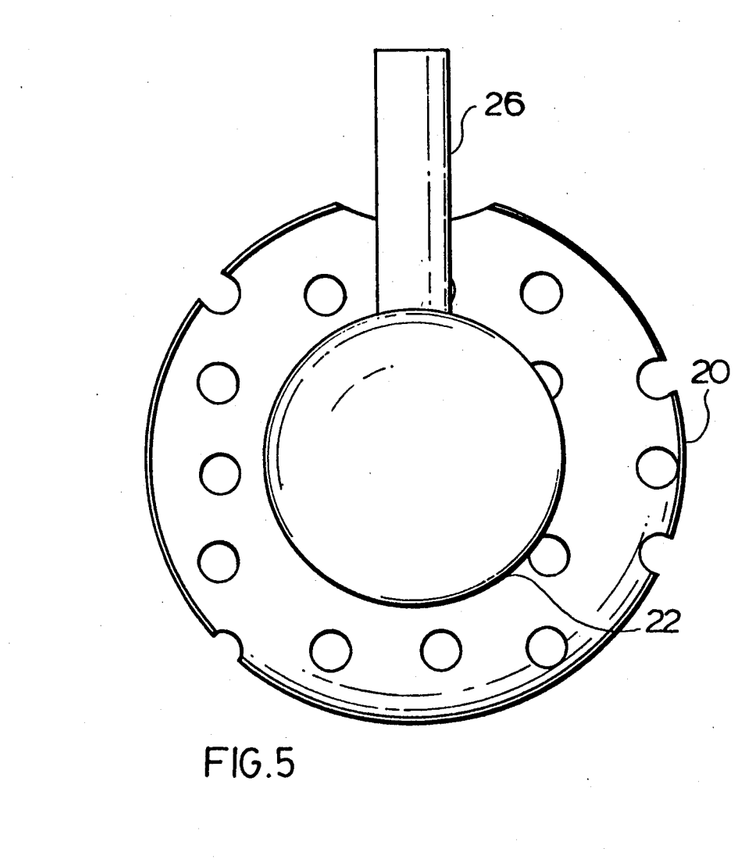
FIG. 5 is a sectional view along line V—V of FIG. 4.

In yet another, and preferred, embodiment the first and second electrodes are both spherically shaped. An illustration of such an arrangement is shown in FIGS. 4 and 5 wherein a second solid electrode 22 is disposed within a first electrode 20 (see FIG. 5). First electrode 20 is a hollow sphere which preferably comprises a plurality of perforations 24. Second electrode 22 is spaced from first electrode 20 by externally clamping a non-conductive section 26 which is connected to second electrode 22. First electrode 20 may comprise an opening large enough to permit entry (and withdrawal) of second electrode 22, or in the alternative, first electrode 20 may comprise one or more removably engageable sections (e.g. first electrode 20 may comprise two semi-spheroids) to permit entry (and withdrawal) of second electrode 22. Preferably, first electrode 20 and second electrode 22 have co-incident centers.

The composition of the first and second electrodes is not particularly restricted provided the electrodes are capable of functioning as such in an electrolytic cell. In accordance with an aspect of the invention, water to be treated is subjected to electrolysis in the presence of carbon. This carbon may be a component of one or both of the first and second electrodes, or it may be added to the electrolytic cell in any suitable form during electrolysis.

Non-limiting examples of materials suitable for use as first and second electrodes include AISI Types 304 (carbon content typically 0.08 percent by weight) and 317L (carbon content typically 0.03 percent by weight) stainless steel.

In another embodiment elemental carbon is added to the electrolytic cell, such addition being achieved by any suitable means. Such means would be within the purview of a person skilled in the art. Preferably, such carbon is in the form of graphite. The graphite can be in the form of a powder added to the electrolytic cell or a solid rod which is immersed in the electrolytic cell during the process.

In yet another embodiment, carbon may be the sole component of either or both of the first and second electrodes. Non-limiting examples of carbon materials suitable for use as the sole component of the electrode include graphite and the like.

The electrolyte suitable for use in the invention is not particularly restricted. Preferably the electrolyte is strong (i.e. ionizes substantially completely). Non-limiting examples of strong electrolytes include $HNO_3$, $HClO_4$, $H_2SO_4$, $HCl$, $HI$, $HBr$, $HClO_3$, $HBrO_3$, alkali hydroxides, alkaline-earth hydroxides (e.g. calcium hydroxide) and most salts (e.g. calcium chloride and sodium chloride). Preferably, the electrolyte is selected from calcium chloride, sodium chloride, calcium hydroxide and mixtures thereof. The electrolyte may be added in any suitable form. For example, if the electrolyte is a solid, it may be dissolved in the water to be treated prior to entry into or while actually in the electrolytic cell. Alternatively, the electrolyte may be dissolved and stored as a solution in a separate vessel. The electrolyte solution would then be added, as required to the electrolyte cell. If the electrolyte is in the form of a liquid, it may be added, as required, to the electrolytic cell either neat or in the form of a dilute aqueous solution.

Figure 6:
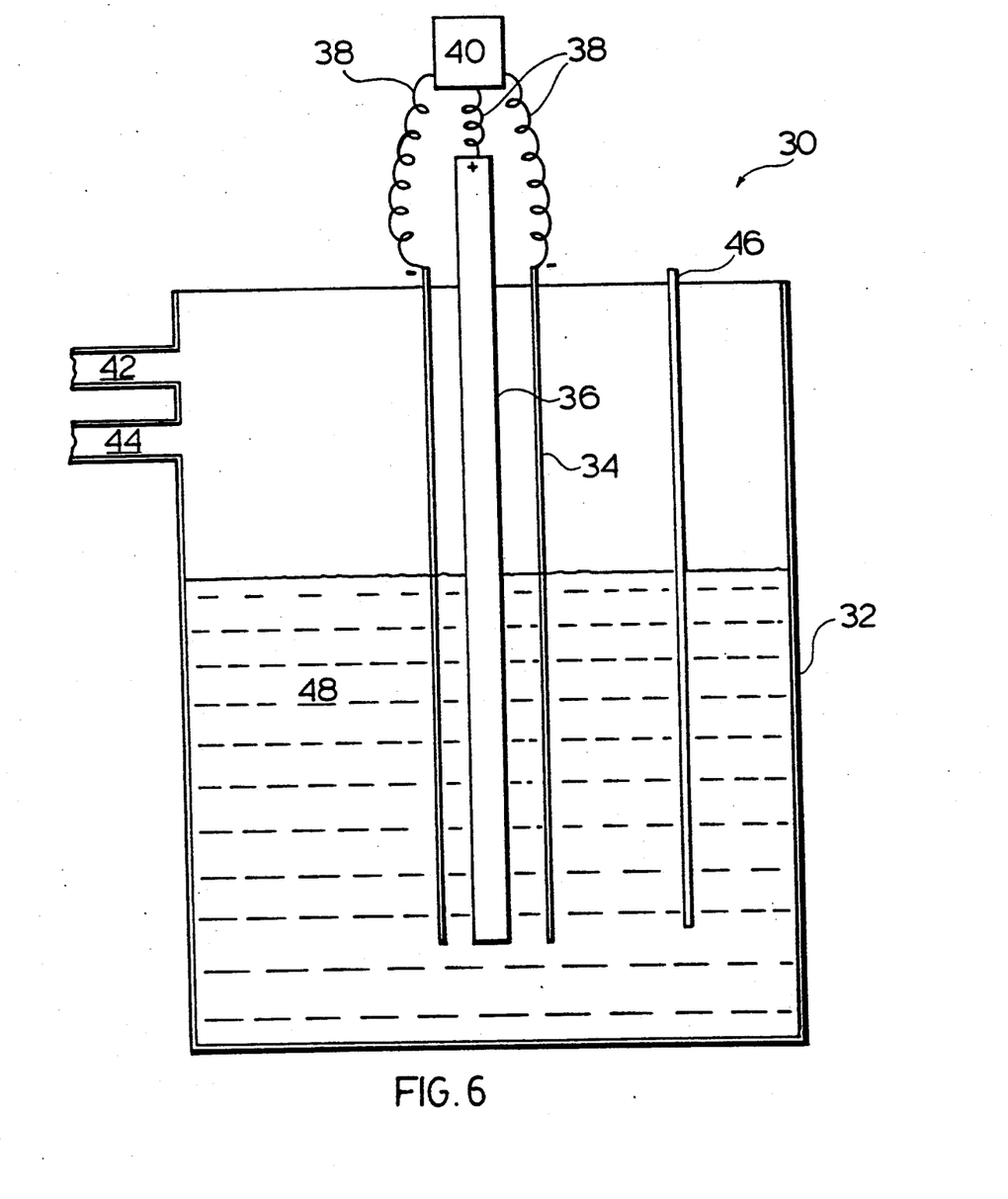
FIG. 6 is a sectional view of an apparatus for treating water.

With reference to FIG. 6, there is illustrated at 30 an apparatus for treating water. Apparatus 30 comprises an electrolyte cell 32 comprising a first electrode 34 (the cathode in this arrangement) and a second electrode 36 (the anode in this arrangement). First electrode 34 and second electrode 36 are in a coaxial relationship with respect to one another as illustrated in FIGS. 1, 2 and 3. Electrodes 34 and 36 are connected to a direct current source 40 via wires 38. Electrolytic cell 32 comprises inlets 42 and 44 which are used to introduce electrolyte and water to be treated into electrolytic cell 32. It is not particularly important which inlet is used for the electrolyte and the water. Electrolytic cell 32 further comprises a graphite rod 46 which may be replaced as it becomes consumed during the process.

In operation, water to be treated and electrolyte are introduced via inlets 42 and 44 into electrolytic cell 32 to form a water/electrolyte mixture 48. Concurrently, direct current source 40 is turned on to supply thereby electricity to electrodes 34 and 36.

Upon the application of electricity to electrodes 34 and 36, electrolysis of mixture 48 occurs. Depending on the nature of the water to be treated and/or the impurities contained therein, precipitation will result either in deposition of solids (not shown) at the bottom of cell 32 or in formation of floc (not shown) on the surface of mixture 48. If the former occurs, relatively purified water may be removed from the top of cell 32 by any suitable means such as overflow techniques (not shown). Alternatively, if the formation of floc occurs, relatively purified water may be removed from the bottom of cell 32 by any suitable means such as a pump (not shown). In either case the mode of removing the relatively purified water from the apparatus is within the purview of a person skilled in the art. Electrolysis according to the present process may also lead to decomposition of various impurities in the water to gaseous by-products which thereafter diffuse from the water.

It should be appreciated that the process can be carried out in a batch mode or in a continuous mode. It is preferred to carry the process out in a continuous mode.

Embodiments of the present invention will now be described with reference to the following Examples which should not be construed so as to limit the scope of the invention.

EXAMPLE 1

A bulk sample of crude effluent was obtained from a major pulp and paper manufacturer. Portions of this sample were treated in an electrolytic cell comprising two cathode-anode pairs similar to the one illustrated in FIGS. 1-3 herein. Each anode and cathode was constructed of AISI Type 304 stainless steel. Two power supplies, each capable of providing 6 volts/2 amps, were connected in series to the cathode-anode pairs.

Four such electrolytic cells were set up in series whereby the effluent from the first cell could be transferred, after filtration of any precipitate, to the second cell and so on.

To initiate the test, 1950 mL of crude effluent was introduced into the first electrolytic cell. Electrolysis of the effluent was conducted at 37° C. for 15 minutes. Agitation of the effluent was provided at 3 minute intervals. The electrolyte used during the test was calcium chloride (0.580 g). At the end of the test period the treated effluent was filtered and the filtrate was introduced into the second electrolytic cell wherein electrolysis was conducted under identical conditions (i.e. temperature, electrolyte, time period and agitation) as in the first electrolytic cell This procedure was repeated for the third and fourth electrolytic cells. The treated effluent from the fourth electrolytic cell was filtered and the filtrate therefrom was analyzed for comparison with the original crude effluent A comparison of the metal and ionic species content for the crude effluent and the filtrate from the fourth electrolytic cell is provided in Table 1 wherein all units are in ppm. Testing was conducted pursuant to APHA Standard Methods #16 and included the use of inductively coupled plasma spectrometry. In Table 1 there is also provided (where possible) an indication of the maximum acceptable concentration of the particular species allowed by the Ontario Drinking Water Objective (ODWO).

As is evident from Table 1, a reduction or maintenance was achieved in the concentration of virtually all species tested. In the case of phosphate, iron and manganese it was possible to reduce the concentration from otherwise unacceptable levels to levels significantly below the maximum acceptable concentration allowed by the ODWO. Significant reduction in concentration was also achieved for magnesium, aluminum, barium, boron, chromium, copper, lead, titanium, vanadium, zinc and zirconium. The increase in the concentration of calcium is attributable to the presence of a calcium-based electrolyte and may be reduced by using reduced levels of such an electrolyte.

TABLE 1

|  | ODWO | CRUDE EFFLUENT | FILTRATE FROM FOURTH ELECTROLYTIC CELL |
| --- | --- | --- | --- |
| Phosphate (as P) | 0.2 | 0.8 | 0.033 |
| Sulfate | 500 | 33300** | 11.4 |
| Calcium | 200 | 62 | 206 |
| Magnesium | 150 | 14 | 0.16 |
| Potassium | — | 5.3 | 5.2 |
| Aluminum | — | 1.51 | 0.05 |
| Barium | 1.0 | 0.098 | 0.012 |
| Beryllium | — | <0.0006 | <0.0006 |
| Boron | 5.0 | 0.562 | 0.124 |
| Cadmium | 0.005 | 0.005 | 0.005 |

TABLE 1-continued

| | ODWO | CRUDE EFFLUENT | FILTRATE FROM FOURTH ELECTROLYTIC CELL |
|---|---|---|---|
| Chromium | 0.05 | 0.024 | 0.01 |
| Cobalt | — | <0.004 | <0.004 |
| Copper | 1.0 | 0.141 | 0.012 |
| Iron | 0.3 | 2.9 | 0.03 |
| Lead | 0.05 | <0.02 | <0.02 |
| Manganese | 0.05 | 0.67 | 0.002 |
| Sodium | 20 | 75 | 86 |
| Molybdenum | — | <0.01 | <0.01 |
| Nickel | — | <0.02 | 0.03 |
| Silicon (as Silica) | — | 19 | 0.41 |
| Silver | 0.05 | <0.003 | <0.003 |
| Strontium | — | 0.19 | 0.27 |
| Thallium | — | 0.074 | <0.06 |
| Titanium | — | 0.045 | 0.018 |
| Vanadium | — | 0.007 | 0.002 |
| Zinc | 5.0 | 0.437 | 0.003 |
| Zirconium | — | 0.01 | <0.003 |

**derived from sulfuric acid used to preserve sample

Figure 7:
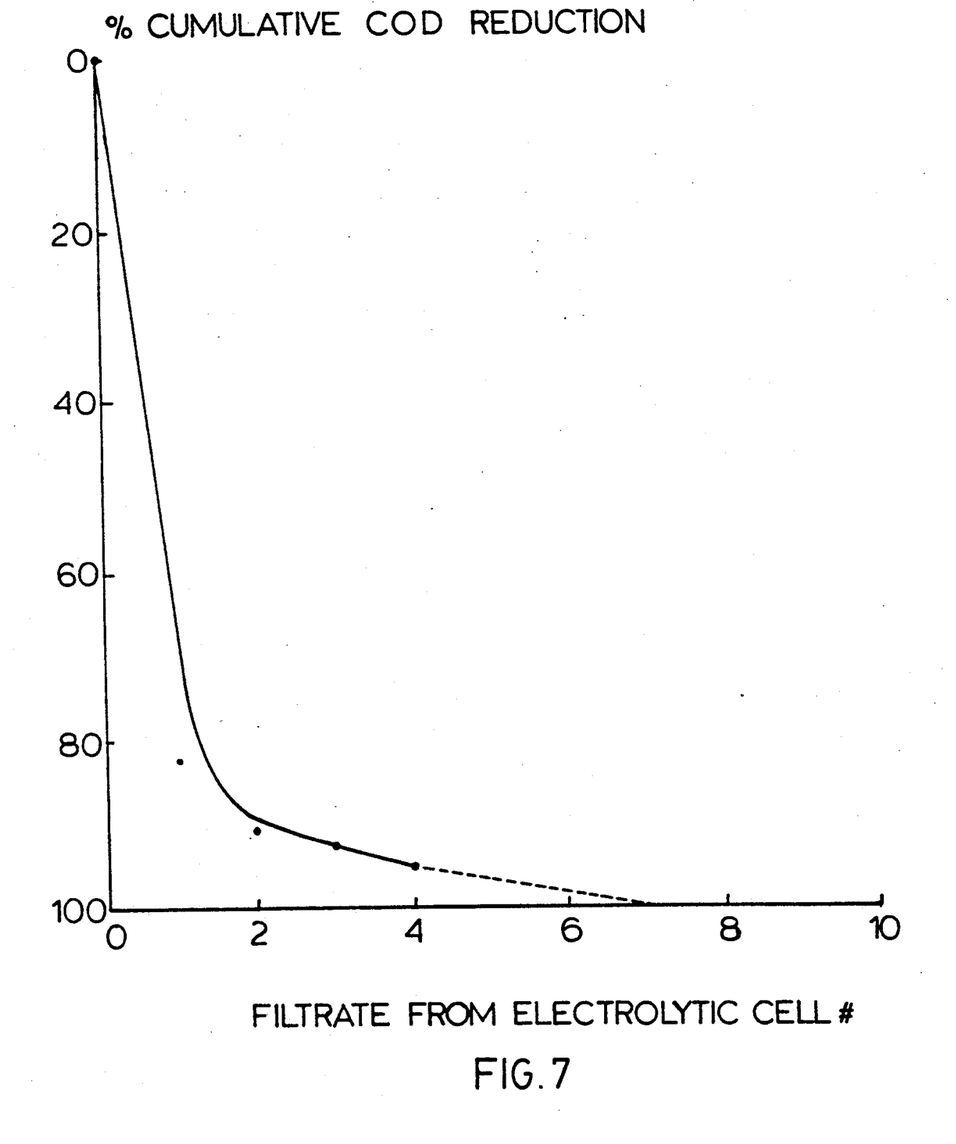
FIG. 7 is a graph illustrating the cummulative COD reduction achievable using an embodiment of the invention.

The chemical oxygen demand (COD) of the crude effluent was determined by oxidation of organic matter in the effluent (APHA Standard Methods #16). Oxidation was achieved utilizing a boiling acidic dichromate solution. COD is a measurement of the concentration of chemicals in a sample of water which may consume dissolved oxygen in the sample. In this instance the COD of the crude effluent was found to be 1590 ppm. In contrast the COD of the filtrate from the fourth electrolytic cell was found to be 80 ppm. The data for COD reduction for each of the four electrolytic cells (E.C.) is presented in Table 2. The dramatic reduction in COD which was achieved is illustrated in FIG. 7 where it can be seen that it may be possible to achieve 100% COD reduction by utilizing seven electrolytic cells.

trated in FIGS. 1-3 herein. The anode was constructed of Type AGSX Carbon (graphite) and the cathode of AISI Type 304 stainless steel. A power supply capable of providing 18 volts/6 amps was connected to the cathode-anode pair.

To initiate the test, 1000 mL of the sample solution was introduced into the electrolytic cell. Electrolysis of the sample solution was conducted at 70° C. for 20 minutes. Agitation of the sample solution was provided at 3 minute intervals. The electrolyte used during the process was sodium chloride (0.4 g).

The sample solution was analyzed before and after treatment to determine the concentration of PCB. This analysis was conducted using gas chromatography (electron capture detector). The results of this analysis are provided in Table 3.

TABLE 3

| | CONCENTRATION OF PCB (ppb) | | |
|---|---|---|---|
| PCB | BEFORE TREATMENT | AFTER TREATMENT | % REDUCTION |
| 1242 | 50 | 1.7 | 96.6 |
| 1260 | 50 | 3.2 | 93.6 |

TABLE 2

| | COD | % COD REDUCTION | CUMMULATIVE % REDUCTION |
|---|---|---|---|
| Crude Effluent | 1590 | — | — |
| Filtrate from First E.C. | 280 | 82.4 | 82.4 |
| Filtrate from Second E.C. | 150 | 46.4 | 90.6 |
| Filtrate from Third E.C. | 120 | 20.0 | 92.5 |
| Filtrate from Fourth E.C. | 80 | 33.3 | 95.0 |

As is evident from Table 3, a significant reduction in PCB concentration was achieved. It will be appreciated that this reduction was achieved relatively easily (i.e. at a temperature less than 100° C.) when compared with prior art techniques (discussed above) for decomposing PCB's. Further, with the present process, a power outage would not be catastrophic since there are no known potential emission problems associated with the present process.

EXAMPLE 2

In this Example, a number of tests were conducted to illustrate the applicability of the present invention to treating water samples containing PCB's. Two types of PCB's were used: PCB 1242 (a mixture of biphenyls containing about 42% chlorine) and PCB 1260 (a mixture of biphenyls containing about 60% chlorine).

Sample solutions were prepared by dissolving 50 micrograms of the PCB in sufficient distilled water to provide 1 liter of solution. Thus the final concentration of PCB in the solution was 50 ppb. Portions of the sample solution were treated in an electrolytic cell comprising an cathode-anode pair similar to the one illus-

EXAMPLE 3

In this Example, PCB's were treated using the same sample solution and the same electrolytic cell which were used in Example 2. In this Example, however, the power supply used was capable of providing 48 volts/6 amps.

To initiate the test, 1000 mL of the sample solution was introduced into the electrolytic cell. Electrolysis of the sample solution was conducted at 37° C. for 46 minutes. Mild agitation of the sample solution was continuously provided. The electrolyte used during the process was either sodium chloride (0.39 g) or calcium chloride (0.40 g).

The sample solution was analyzed before and after treatment in the manner described in Example 2. The results of the analysis are provided in Table 4.

TABLE 4

|  | PCB 1242 | PCB 1260 |
|---|---|---|
| Original concentration (ppb) | 50 | 50 |
| Electrolyte: Sodium Chloride | | |
| Final Concentration (ppb) | 1.0 | 0.1 |
| % Reduction | 98.0 | 99.8 |
| Electrolyte: Calcium Chloride | | |
| Final Concentration (ppb) | 0.9 | 0.4 |
| % Reduction | 98.2 | 99.2 |

EXAMPLE 4

In this Example, a number of tests were conducted to illustrate the applicability of the present invention to treating water samples containing dioxins and furans. A dioxin sample solution comprising a mixture of tetra-chloro, penta-chloro, hexa-chloro, hepta-chloro and octa-chloro dioxins was provided. A furan sample solution containing a mixture of tetra-chloro, penta-chloro, hexa-chloro, hepta-chloro and octa-chloro furans was provided.

Portions of these sample solutions were treated in an electrolytic cell similar to the one identified in Example 2. In this Example, however, the power supply used was capable of providing 48 volts/6 amps.

To initiate the test, 950 mL of the sample solution was introduced into the electrolytic cell. Electrolysis of the sample solution was conducted at 37° C. for 60 minutes. Mild agitation of the sample solution was continuously provided. The electrolyte used during the process was calcium chloride (0.5 g). During electrolysis of the sample solution (dioxin and furan) the temperature increased to about 95° C. and the volume of the solution decreased (by evaporation) to about 800 mL.

The sample solution was analyzed before and after treatment in the manner described in Example 2. The results of this analysis are provided in Table 5 and include the determined concentration of each species in the untreated sample solution.

The data provided in Table 5 are not believed to be absolutely precise. Specifically, for each group of compounds, the reference standard used for analysis was a single isomer. For example, the tetra-chloro dioxin used was a mixture of 22 isomers whereas only one isomer was used as the reference standard during analysis. Accordingly, the result for each particular group is believed to be representative (i.e. not absolute for each member of the group) for the group as a whole. In any event, Table 5 provides clear evidence that the concentration of dioxins and furans in water samples may be reduced significantly using the present process.

EXAMPLE 5

In this Example, a number of tests were conducted to illustrate the applicability of the present invention to treating water samples containing selected bacteria Two types of bacteria were used: *Escherichia coli* (*E. coli*) and *Pseudomonas aeruginosa* (*P. aeruginosa*). These bacteria were selected since they are pathogenic to humans.

Sample solutions were prepared by dispensing (and mixing) a 1 mL aliquot of the bacteria, which was provided in the form of culture, into 1000 mL of an isotonic solution. The sample solutions were subjected to electrolysis using the same electrolytic cell which was used in Example 2. In this Example, however, the power supply used was capable of providing 12 volts/6 amps.

To initiate the test, 1000 mL of the sample solution was introduced into the electrolytic cell. Electrolysis of the sample solution was conducted in a manner whereby the temperature did not exceed 40° C. This was necessary to ensure that reduction in bacteria could not be attributed to thermal effects. Mild agitation of the sample solution was continuously provided. An electrolyte was not required for this test since the bacteria were dispersed in an isotonic solution.

The sample solution was analyzed before and after treatment using conventional bacteria counting techniques. The results of this analysis together with the reaction time and temperature for each test are provided in Table 6. In Table 6, a "count" represents the number of viable (i.e. living) bacterial cells per milliliter of diluted culture.

As is evident from Table 6, the present process was able to completely destroy both types of bacteria.

TABLE 5

|  | Dioxin Sample Solution | | | Furan Sample Solution | | |
|---|---|---|---|---|---|---|
|  | Untreated | Treated | % Reduction | Untreated | Treated | % Reduction |
| Tetra-chloro | 1.2 | 0.15 | 87.5 | 1.5 | 0.21 | 86.0 |
| Penta-chloro | 0.95 | 0.48 | 49.5 | 1.5 | 0.12 | 92.0 |
| Hexa-chloro | 1.1 | 0.17 | 84.5 | 1.5 | 0.15 | 90.0 |
| Hepta-chloro | 1.7 | 0.37 | 78.2 | 2.8 | 0.32 | 88.6 |
| Octa-chloro | 1.3 | 0.22 | 83.1 | 1.6 | N.D. | N.C. |

Notes:
N.D. none detected
N.C. Not calculatable

TABLE 6

|  | E. coli | P. aeruginosa |
|---|---|---|
| Before treatment, count | $3.0 \times 10^6$ | $2.1 \times 10^6$ |
| After treatment, count | | |
| Reaction time for *P. aeruginosa* = 30 minutes Temperature = 16°-40° C. | — | <1 |
| Reaction time for *E. coli* = 23 minutes Temperature = 18°-40° C. | <1 | — |

EXAMPLE 6—(Experiments 1-2)

In this Example, a number of tests were conducted to illustrate the importance of having a first electrode spaced from and at least partially encompassing a second electrode. Preferably, the first (preferably the cathode) and second (preferably the anode) electrodes are in a coaxial arrangement (FIGS. 1-3). In such an arrangement, the spacing between the two electrodes may be represented by the ratio of the annular cathode inner diameter to the diameter of the cylindrical anode Thus, for this Example specific variables have been defined as follows:

$d_2$ = inner diameter of annular cathode $d_1$ = diameter of cylindrical anode $R = d_2/d_1$ A bulk sample of crude effluent was obtained from a major pulp and paper manufacturer. A number of experiments were conducted according to the following general procedure. To initiate each experiment, 1000 mL of crude effluent was introduced into an electrolytic cell comprising an anode and a cathode. The exact arrangement and construction of the anode and cathode was varied and this will be described in detail hereinafter. Electrolysis was conducted at a temperature of 20° C. for 10 minutes. Agitation of the effluent was provided continuously. The electrolyte used was calcium chloride (0.5 g). The power supply used was capable of providing 12 volts/6 amps. At the end of the test period, the treated effluent was filtered and the filtrate therefrom was analyzed using the conventional analytical techniques described in Example 1.

Experiment 1

The electrodes used in this Experiment were arranged in the manner illustrated in FIGS. 1-3 herein. Thus, the anode was a solid rod disposed coaxially with the cylindrical cathode. Both the anode and the cathode were constructed of AISI Type 304 stainless steel.

The value R for the anode and cathode was varied according to Table 7. In Table 7, $d_2$ was held constant at 0.875 inches. The spacing between the electrodes (and thus R) was altered by altering $d_1$.

TABLE 7

| $d_1$ (in) | R |
|---|---|
| 0.750 | 1.17 |
| 0.700 | 1.25 |
| 0.583 | 1.50 |
| 0.500 | 1.75 |
| 0.438 | 2.00 |
| 0.350 | 2.50 |
| 0.292 | 3.00 |
| 0.250 | 3.50 |
| 0.219 | 4.00 |
| 0.194 | 4.50 |

The results of this Experiment are provided in Table 8 wherein all units are in ppm.

From the data in Table 8 it can be readily appreciated that the reduction in or maintenance of concentration of the following species is favored at relatively low values for R (i.e. relatively narrow spacing):

| | |
|---|---|
| COD | Magnesium |
| Calcium | Sodium |
| Aluminum | Barium |
| Boron | Cobalt |
| Copper | Iron |
| Lead | Manganese |
| Molybdenum | Silicon |
| Silver | Thallium |
| Titanium | Vanadium |
| Zinc | Zirconium |
| Sulfate | Phosphate |
| Strontium | |

TABLE 8

| | CRUDE EFFLUENT (FROM EXAMPLE 1) | R | | | | | | | | | |
|---|---|---|---|---|---|---|---|---|---|---|---|
| | | 1.17 | 1.25 | 1.50 | 1.75 | 2.00 | 2.50 | 3.00 | 3.50 | 4.00 | 4.50 |
| COD | 805 | 105 | 140 | 145 | 180 | 185 | 190 | 225 | 215 | 225 | 218 |
| Calcium | 61 | 170 | 210 | 210 | 220 | 220 | 230 | 230 | 230 | 210 | 240 |
| Magnesium | 11 | 1.1 | 4.9 | 3.1 | 6.1 | 6.7 | 7.7 | 8.1 | 8.0 | 8.1 | 8.4 |
| Sodium | 78 | 73 | 70 | 71 | 70 | 69 | 70 | 70 | 70 | 70 | 72 |
| Potassium | 5.5 | 5.7 | 5.6 | 5.9 | 4.8 | 4.9 | 5.7 | 5.1 | 5.0 | 5.4 | 4.6 |
| Aluminum | 2.1 | 0.04 | 0.038 | 0.037 | 0.033 | <0.03 | 0.036 | <0.03 | 0.051 | <0.03 | 0.041 |
| Barium | 0.16 | 0.058 | 0.046 | 0.061 | 0.065 | 0.067 | 0.073 | 0.07 | 0.071 | 0.071 | 0.073 |
| Boron | 1.5 | 0.78 | 1.0 | 0.96 | 0.98 | 1.0 | 1.1 | 1.2 | 1.1 | 1.2 | 1.3 |
| Cadmium | 0.004 | 0.004 | 0.002 | <0.002 | 0.003 | <0.002 | 0.003 | 0.004 | <0.002 | <0.002 | <0.002 |
| Chromium | 0.017 | 0.009 | 0.005 | 0.007 | <0.004 | 0.005 | 0.007 | 0.007 | 0.007 | 0.006 | 0.005 |
| Cobalt | <0.01 | <0.01 | <0.01 | <0.01 | <0.01 | <0.01 | <0.01 | 0.02 | <0.02 | 0.02 | 0.03 |
| Copper | 0.11 | 0.03 | 0.021 | 0.01 | 0.01 | 0.007 | 0.009 | 0.013 | 0.011 | 0.02 | 0.033 |
| Iron | 0.86 | 0.04 | 0.08 | 0.07 | 0.16 | 0.28 | 0.74 | 1.4 | 1.1 | 1.7 | 3.9 |
| Lead | <0.02 | <0.02 | <0.02 | <0.02 | <0.02 | <0.02 | <0.02 | <0.02 | <0.02 | <0.02 | <0.02 |
| Manganese | 0.39 | 0.016 | 0.18 | 0.039 | 0.12 | 0.16 | 0.36 | 0.67 | 0.5 | 0.69 | 0.84 |
| Molybdenum | <0.02 | <0.02 | <0.02 | <0.02 | <0.02 | <0.02 | <0.02 | <0.02 | <0.02 | <0.02 | <0.02 |
| Nickel | 0.095 | 0.032 | 0.19 | 0.091 | 0.18 | 0.25 | 0.46 | 1.0 | 0.68 | 1.1 | 2.0 |
| Silicon | 8.7 | 0.21 | 0.65 | 0.32 | 0.8 | 0.95 | 2.1 | 3.7 | 2.8 | 4.2 | 6.3 |
| Silver | <0.01 | <0.01 | <0.01 | <0.01 | <0.01 | <0.01 | <0.01 | <0.01 | <0.01 | <0.01 | <0.01 |
| Strontium | 0.26 | 0.26 | 0.26 | 0.27 | 0.27 | 0.27 | 0.28 | 0.28 | 0.28 | 0.27 | 0.29 |
| Thallium | <0.06 | <0.06 | <0.06 | <0.06 | <0.06 | <0.06 | <0.06 | <0.06 | <0.06 | <0.06 | <0.06 |
| Titanium | 0.092 | <0.01 | <0.01 | <0.01 | <0.01 | <0.01 | <0.01 | <0.01 | <0.01 | <0.01 | <0.01 |
| Vanadium | 0.006 | <0.005 | <0.005 | <0.005 | <0.005 | <0.005 | <0.005 | <0.005 | <0.005 | <0.005 | <0.005 |
| Zinc | 0.68 | 0.011 | 0.014 | 0.009 | 0.009 | 0.007 | 0.009 | 0.019 | 0.012 | 0.017 | 0.031 |
| Zirconium | <0.01 | <0.01 | <0.01 | <0.01 | <0.01 | <0.01 | <0.01 | <0.01 | <0.01 | <0.01 | <0.01 |
| Sulfate | 240 | 131 | 141 | 330 | 360 | 360 | 273 | 237 | 270 | 246 | 237 |
| Phosphate | 1.10 | <0.18 | <0.18 | <0.18 | <0.18 | <0.18 | <0.18 | <0.18 | <0.18 | <0.18 | <0.18 |

The only members in Table 8 not found in this list are potassium, calcium and chromium. Thus, it is preferred that R be in the range of from about 1.10 to about 3.50, more preferably from about 1.10 to about 1.75, most preferably from about 1.10 to about 1.30.

Experiment 2

The test conditions used in this Experiment were identical to those described in Experiment 1. However in this Experiment the electrodes used were not in a coaxial arrangement. Rather, the anode and cathode in this Experiment were in the form of flat rectangular plates in a parallel arrangement with respect to one another. Both plates were constructed from AISI Type 304 stainless steel. The surface area of each side of each plate was identical to the surface area of the solid cylindrical anode (curved surface) having a diameter of 0.500 inches used in Experiment 1. Accordingly, it will be appreciated that, since neither of the electrodes at least partially encompasses the other, this Experiment is outside the scope of the present invention.

In this Experiment, the distance (W) between the parallel electrodes was varied. The results of the analytical tests performed on effluents treated in this Experiment are provided in Table 9.

As is evident from the data in Table 9, the process using parallel plate electrodes did not exhibit a dominant preference for narrow or for wide spacing between the parallel plates when compared with the results obtained in Experiment 1 (i.e. high preference for coaxial arrangement of electrodes having narrow

TABLE 9

|  | CRUDE EFFLUENT (FROM EXAMPLE 1) | W (in) | | | | |
| --- | --- | --- | --- | --- | --- | --- |
|  |  | 0.0625 | 0.25 | 0.5 | 1.0 | 2.0 |
| COD | 805 | 185 | 185 | 255 | 280 | 220 |
| Calcium | 61 | 230 | 230 | 210 | 220 | 49 |
| Sodium | 78 | 72 | 72 | 66 | 69 | 110 |
| Magnesium | 11 | 7.2 | 8.7 | 8.4 | 8.5 | 8.6 |
| Potassium | 5.5 | 4.7 | 4.6 | 4.0 | 4.3 | 1.1 |
| Aluminum | 2.1 | <0.03 | <0.03 | 0.21 | <0.03 | 0.32 |
| Barium | 0.16 | 0.056 | 0.068 | 0.071 | 0.066 | 0.07 |
| Boron | 1.5 | 1.2 | 1.2 | 1.2 | 1.2 | 0.59 |
| Cadmium | 0.004 | <0.002 | <0.002 | 0.004 | <0.002 | <0.002 |
| Chromium | 0.017 | 0.018 | 0.15 | 1.9 | 0.45 | 0.004 |
| Cobalt | <0.01 | 0.014 | 0.026 | 0.022 | 0.026 | <0.01 |
| Copper | 0.11 | 0.045 | 0.067 | 0.068 | 0.077 | 0.037 |
| Iron | 0.86 | 2.3 | 1.6 | 8.7 | 4.1 | 0.36 |
| Lead | <0.02 | <0.02 | <0.02 | <0.02 | <0.02 | <0.02 |
| Manganese | 0.39 | 1.1 | 1.1 | 0.78 | 0.93 | 0.65 |
| Molybdenum | <0.02 | 0.088 | 0.05 | 0.034 | 0.042 | <0.02 |
| Nickel | 0.095 | 2.0 | 3.0 | 2.2 | 2.5 | <0.01 |
| Silicon | 8.7 | 3.3 | 7.5 | 9.0 | 7.5 | 37 |
| Silver | <0.01 | <0.01 | <0.01 | <0.01 | <0.01 | <0.01 |
| Strontium | 0.26 | 0.27 | 0.27 | 0.26 | 0.26 | 0.18 |
| Thallium | <0.06 | <0.06 | <0.06 | <0.06 | <0.06 | <0.06 |
| Titanium | 0.092 | <0.01 | <0.01 | 0.049 | <0.01 | 0.042 |
| Vanadium | 0.006 | <0.005 | <0.005 | <0.005 | <0.005 | <0.005 |
| Zinc | 0.68 | 0.007 | 0.015 | 0.039 | 0.023 | 0.92 |
| Zirconium | <0.01 | <0.01 | <0.01 | <0.01 | <0.01 | <0.01 |
| Sulfate | 240 | 186 | 210 | 192 | 195 | 120 |
| Phosphate | 1.01 | <0.18 | <0.18 | <0.18 | <0.18 | 1.32 | spacing). Specifically, reduction in concentration of the following species is favored at relatively low spacing between the plates:
COD
Magnesium
Sodium
Aluminum
Barium
Lead
Silicon
Silver
Thallium
Titanium
Vanadium
Zinc
Zirconium
Phosphate whereas reduction in concentration of the following species is favored at relatively high spacing between the plates:
Calcium
Potassium
Boron
Cadmium
Chromium
Cobalt
Copper
Iron
Manganese
Molybdenum
Nickel
Strontium
Sulfate In view of the foregoing, there is a surprising, unexpected and beneficial result achieved by utilizing the electrode configuration described in Experiment 1 of this Example.

I claim:

1. A process for treating water containing pollutants, the process comprising the steps of:
   (a) proving an electrolytic cell having a first outer electrode having a plurality of perforations and a second inner coaxially disposed impervious electrode;
   (b) placing said first electrode and said second electrode in a relatively closely adjacent coaxial relationship with respect to one another to define a clear, unobstructed channel therebetween;
   (c) introducing an electrolyte into said cell;
   (d) admitting said water to be treated into said electrolytic cell;
   (e) feeding said water to be treated through said perforations into said channel;
   (f) subjecting said water passing within said channel to electrolysis in said cell in the presence of said electrolyte; and
   (g) maintaining the ratio of the diameter of said first electrode to the diameter of said second electrode in the range of from about 1.10 to about 3.50 to effect a substantial reduction in pollutants.

2. The process defined in claim 1, wherein said second electrode is solid.

3. The process defined in claim 1, wherein said first electrode and said second electrode have a substantially circular cross-section and said channel is annular.

4. The process defined in claim 1, wherein the ratio of the diameter of said first electrode to the diameter of said second electrode is in the range of from about 1.10 to about 1.75.

5. The process defined in claim 1, wherein the ratio of the diameter of said first electrode to the diameter of said second electrode is in the range of from about 1.10 to about 1.30.

6. The process defined in claim 1, wherein said water comprises as pollutants at least one member selected from the group consisting essentially of mine water effluent, smelting operation effluent, electroplating effluent, pulp and paper effluent, municipal sewage treatment effluent, polychlorinated biphenyls, dioxins furans and polybrominated biphenyls.

7. The process defined in claim 5, wherein said water comprises as pollutants pulp and paper effluent.

8. An apparatus for treating water to effect a substantial reduction in pollutants contained therein comprising:

(a) an electrolytic cell which comprises a first outer electrode having a plurality of perforations and a second inner coaxially disposed impervious electrode;

(b) means supporting said electrodes in a relatively closely spaced adjacent coaxial relationship with respect to one another to define a clear, unobstructed channel therebetween having a depth in the range of from about 1.10 to about 3.50 of the diameter of said first electrode to the diameter of said second electrode;

(c) means for introducing water to be treated into said cell;

(d) means for admitting water to be treated through said perforations into said channel for flow between said electrodes;

(e) means for introducing an electrolyte into said cell;

(f) means for applying voltage to said cell; and (g) means for removing water after treatment in said cell.

9. The process defined in claim 8, wherein said second electrode is solid.

10. The process defined in claim 8, wherein said first electrode and said second electrode have a substantially circular cross-section and said channel is annular.

11. The process defined in claim 8, wherein the ratio of the diameter of said first electrode to the diameter of said second electrode is in the range of from about 1.10 to about 1.75.

12. The process defined in claim 8, wherein the ratio of the diameter of said first electrode to the diameter of said second electrode is in the range of from about 1.10 to about 1.30.

* * * * *